US012685968B2

(12) United States Patent     (10) Patent No.:   US 12,685,968 B2

Okajima et al.     (45) Date of Patent:    Jul. 21, 2026

---

(54) WASTEWATER TREATMENT METHOD

(71) Applicant: Kubota Corporation, Osaka (JP)

(72) Inventors: Yasunobu Okajima, Amagasaki (JP); Yukako Ishihara, Amagasaki (JP); Ken Tanaka, Amagasaki (JP)

(73) Assignee: Kubota Corporation, Osaka (JP)

( * ) Notice: Subject to any disclaimer, the term of this patent is extended or adjusted under 35 U.S.C. 154(b) by 280 days.

(21) Appl. No.: 18/569,774

(22) PCT Filed: May 25, 2022

(86) PCT No.: PCT/JP2022/021314

§ 371 (c)(1),
(2) Date: Dec. 13, 2023

(87) PCT Pub. No.: WO2023/286457

PCT Pub. Date: Jan. 19, 2023

(65) Prior Publication Data

US 2024/0278180 A1     Aug. 22, 2024

(30) Foreign Application Priority Data

Jul. 12, 2021    (JP) ................................. 2021-115194

(51) Int. Cl.
   *B01D 65/02*      (2006.01)
   *C02F 3/12*      (2023.01)

(52) U.S. Cl.
   CPC ........... *B01D 65/02* (2013.01); *C02F 3/1273* (2013.01); *B01D 2321/185* (2013.01); *C02F 2201/005* (2013.01); *C02F 2303/16* (2013.01); *C02F 2303/20* (2013.01)

(58) Field of Classification Search
None
See application file for complete search history.

(56) References Cited

U.S. PATENT DOCUMENTS

| | | | |
|---|---|---|---|
| 2009/0255873 A1 | 10/2009 | Biltoft et al. | |
| 2012/0018367 A1 | 1/2012 | Wakahara et al. | |
| 2012/0187043 A1 | 7/2012 | Hashimoto et al. | |

FOREIGN PATENT DOCUMENTS

| | | |
|---|---|---|
| CN | 1535170 A | 10/2004 |
| CN | 203513437 U | 4/2014 |
| JP | 975686 A | 3/1997 |
| JP | 2000279960 A | 10/2000 |
| JP | 2000288543 A | 10/2000 |
| JP | 2004283658 A | 10/2004 |

(Continued)

OTHER PUBLICATIONS

International Search Report for PCT/JP2022/021314 dated Jul. 19, 2022.

(Continued)

*Primary Examiner* — Krishnan S Menon
(74) *Attorney, Agent, or Firm* — Harness Dickey & Pierce P.L.C.

(57) ABSTRACT

While productivity in generation of treated water is improved, a membrane cleaning effect through relaxation is sufficiently exerted. While aeration is carried out with respect to at least one membrane cartridge (18), a cycle of a filtration operation and a filtration stoppage operation is repeated. A gas vent valve (62) connected to a gas retention chamber (52) is used, and the gas vent valve (62) is opened and then closed in accordance with a timing of start of the filtration stoppage operation in each cycle.

3 Claims, 4 Drawing Sheets

(56)  References Cited

FOREIGN PATENT DOCUMENTS

| | | | |
|----|------------|----|---------|
| JP | 2006055718 | A  | 3/2006  |
| JP | 2006231129 | A  | 9/2006  |
| JP | 2007152302 | A  | 6/2007  |
| JP | 2008207143 | A  | 9/2008  |
| JP | 2010234227 | A  | 10/2010 |
| JP | 2011011180 | A  | 1/2011  |
| JP | 2019166424 | A  | 10/2019 |
| KR | 200290102  | Y1 | 9/2002  |
| WO | 2009008463 | A1 | 1/2009  |

OTHER PUBLICATIONS

Written Opinion for PCT/JP2022/021314 (International Preliminary Report on Patentability) dated Jan. 16, 2024.
Search Report from European Application No. 22841804.2 dated Jun. 25, 2025.
Office Action from Chinese Application No. 202280048681.1 dated Mar. 20, 2026.

WASTEWATER TREATMENT METHOD

PRIORITY STATEMENT

This application is a national stage application under 35 U.S.C. § 371 of PCT International Application No. PCT/JP2022/021314, which has an international filing date of 25 May 2022 and claims priority under 35 U.S.C. § 119 to Japanese Patent Application No. 2021-115194 filed on 12 Jul. 2021. The contents of each application recited above are incorporated herein by reference in their entirety.

TECHNICAL FIELD

The present invention relates to a wastewater treatment method for generating treated water by subjecting wastewater to solid-liquid separation.

BACKGROUND ART

In a wastewater treatment system using a membrane bioreactor (MBR), it is inevitable that, during filtration of wastewater, a foulant is deposited on a membrane sheet of a filtration cartridge, leading to an increase in a permeation resistance of the membrane cartridge. Thus, normally, a filtration operation for wastewater is periodically stopped and only aeration is carried out on the membrane cartridge, so that the foulant is removed from the membrane sheet.

That is, while the aeration is carried out on the membrane cartridge, a cycle is repeated which includes a filtration operation of generating a negative pressure on a secondary side (treated water side) of the membrane cartridge so as to filter wastewater and a filtration stoppage operation of stopping the filtration operation. Here, aeration during the filtration stoppage operation is called "relaxation", and the cycle is called an "intermittent filtration cycle".

The action of removal of the foulant from the membrane sheet is brought about through pressure pulsation in the membrane cartridge caused by swinging of the membrane sheet with respect to a filtration plate of the membrane cartridge. Further, during the filtration operation, as a flux (permeation flux) becomes higher, a transmembrane pressure of the membrane cartridge is increased. This increases a force which causes the membrane sheet to stick to the filtration plate. As a result, the pressure pulsation in the membrane cartridge becomes small. Therefore, in order to sufficiently exert a membrane cleaning effect through the relaxation, a proportion of a time period of the filtration stoppage operation in the intermittent filtration cycle needs to be increased so as to secure a time for setting the transmembrane pressure of the membrane cartridge to be in an equilibrium state (to zero).

Patent Literatures 1 and 2 each disclose a wastewater treatment method using an atmospheric opening valve provided in a treated-water pipe system connecting a membrane separation tank and a treated-water tank. In the wastewater treatment method according to such prior art, during a filtration stoppage operation, the atmospheric opening valve is opened so as to open a part of the treated-water pipe system to the atmospheric air, so that the transmembrane pressure of the membrane cartridge is set to be in an equilibrium state.

CITATION LIST

Patent Literature

[Patent Literature 1]
Japanese Patent Application Publication Tokukai No. 2000-288543
[Patent Literature 2]
Japanese Patent Application Publication Tokukaihei No. 9-75686

SUMMARY OF INVENTION

Technical Problem

However, although the increase in the proportion of the time period of the filtration stoppage operation in the intermittent filtration cycle makes it possible to sufficiently exert the membrane cleaning effect through the relaxation, a production volume (generation volume) of treated water per unit time is decreased. This reduces productivity (production efficiency) in generation of the treated water.

In contrast, a decrease in the proportion of the time period of the filtration stoppage operation in the intermittent filtration cycle shortens a time period during which the transmembrane pressure of the membrane cartridge is in the equilibrium state after the start of the filtration stoppage operation. This makes it difficult to sufficiently exert the membrane cleaning effect through the relaxation.

Further, as illustrated in FIG. 1, when a flux during the filtration operation becomes high, a transmembrane pressure of the membrane cartridge is increased, and, without the transmembrane pressure of the membrane cartridge being in the equilibrium state after the start of the filtration stoppage operation, the next filtration operation is started. This poses a risk that it may be impossible to sufficiently exert the membrane cleaning effect through the relaxation.

On the other hand, in the wastewater treatment method according to the prior art, a part of the treated-water pipe system is opened to the atmospheric air during the filtration stoppage operation. Therefore, a time period until restart of the filtration operation becomes long. This reduces productivity in generation of the treated water.

It is therefore an object of an aspect of the present invention to sufficiently exert a membrane cleaning effect through relaxation while productivity in generation of treated water is improved.

Solution to Problem

A wastewater treatment method in accordance with an aspect of the present invention is a wastewater treatment method for generating treated water by subjecting wastewater (to be treated) to solid-liquid separation by repeating, while aeration is carried out on at least one membrane cartridge immersed in the wastewater in a membrane separation tank, a cycle including a filtration operation of generating a negative pressure on a secondary side (treated water side) of the at least one membrane cartridge so as to filter the wastewater and a filtration stoppage operation of stopping the filtration operation, said method including: using a valve that is connected to a gas retention chamber for retaining a gas contained in the treated water and that supplies a fluid to the gas retention chamber, in a manner so as to open and then close the valve in accordance with a timing of start of the filtration stoppage operation in the cycle.

Advantageous Effects of Invention

According to an aspect of the present invention, it is possible to sufficiently exert a membrane cleaning effect through relaxation while productivity in generation of treated water is improved.

DESCRIPTION OF EMBODIMENTS

Embodiment 1

Figure 1:
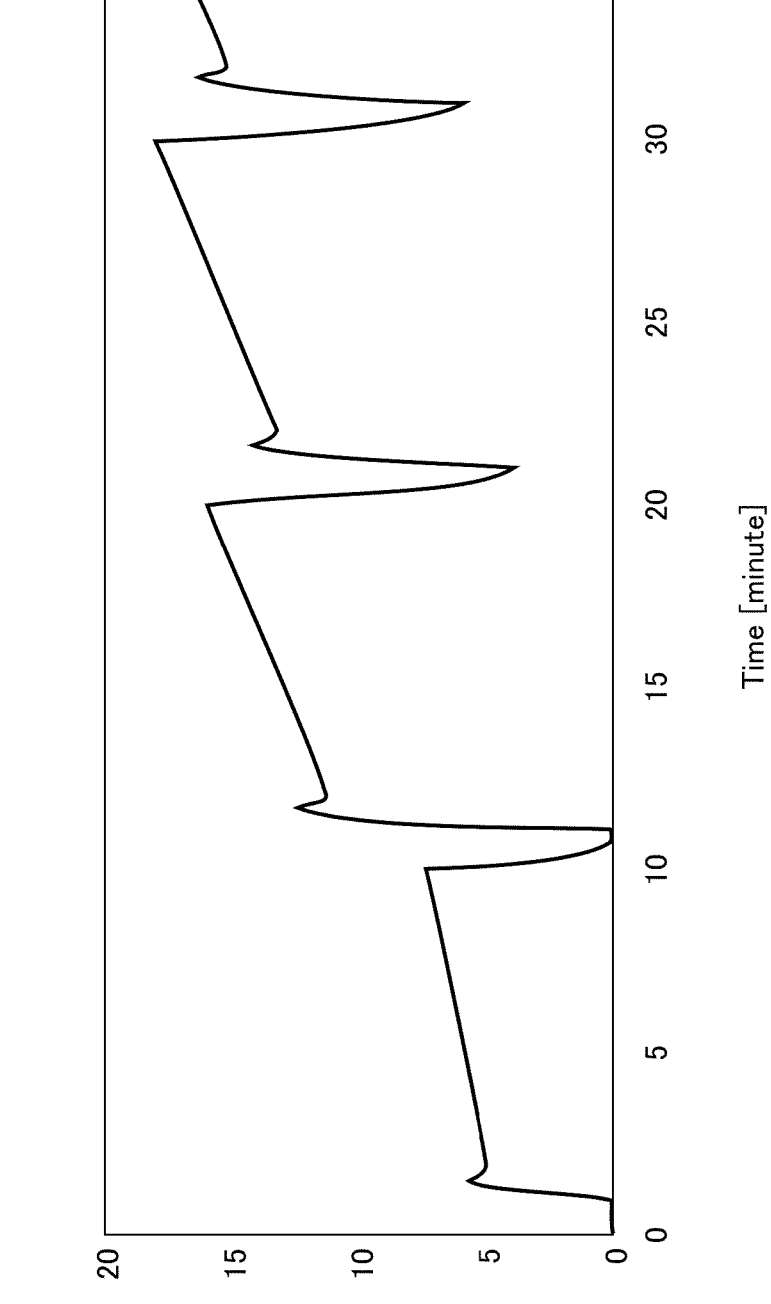
FIG. 1 is a view describing a conventional problem and showing a relationship between a transmembrane pressure of a membrane cartridge and time.
Figure 2:
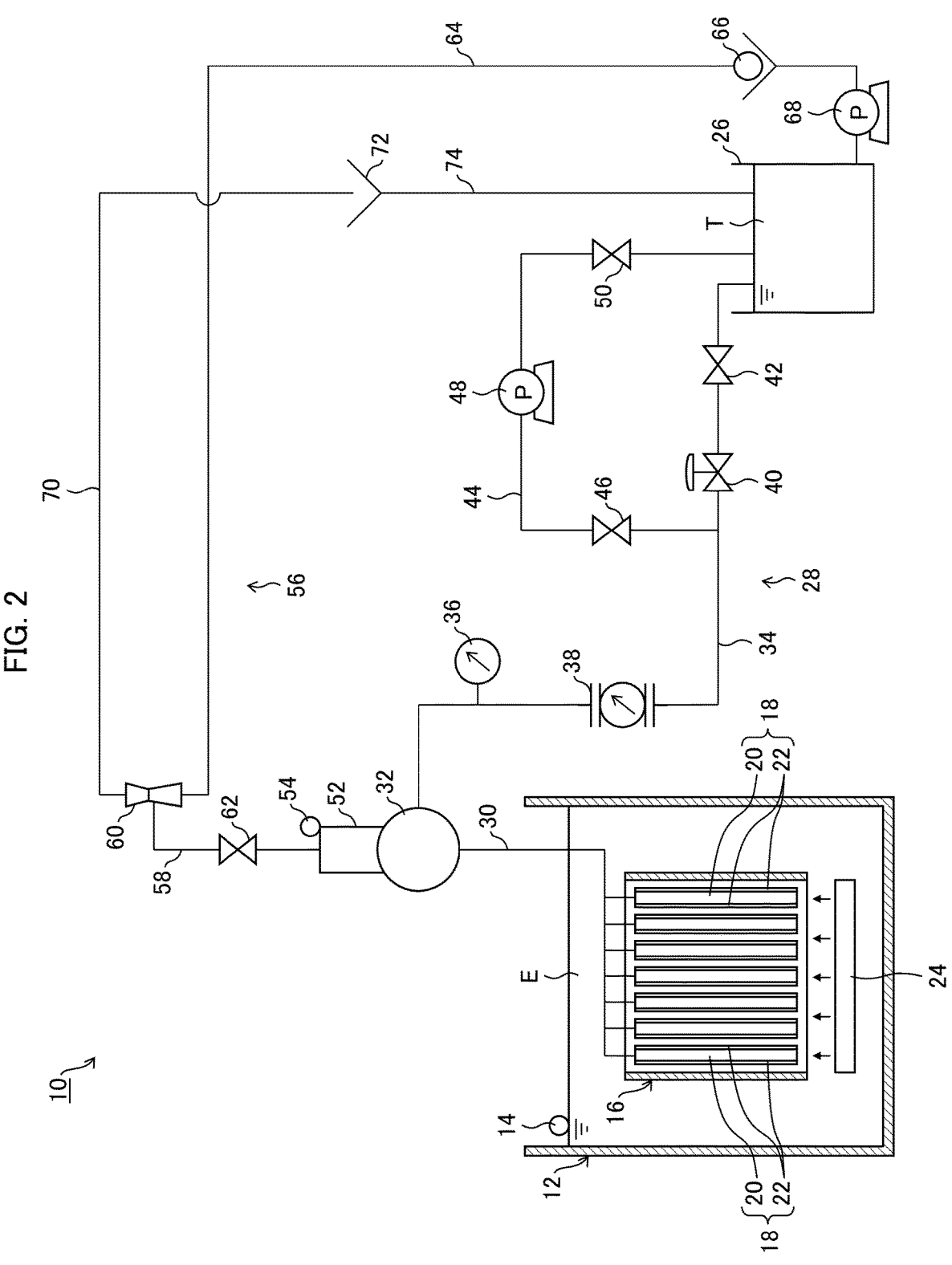
FIG. 2 is a view schematically illustrating a wastewater treatment system for carrying out a wastewater treatment method in accordance with Embodiment 1.
Figure 3:
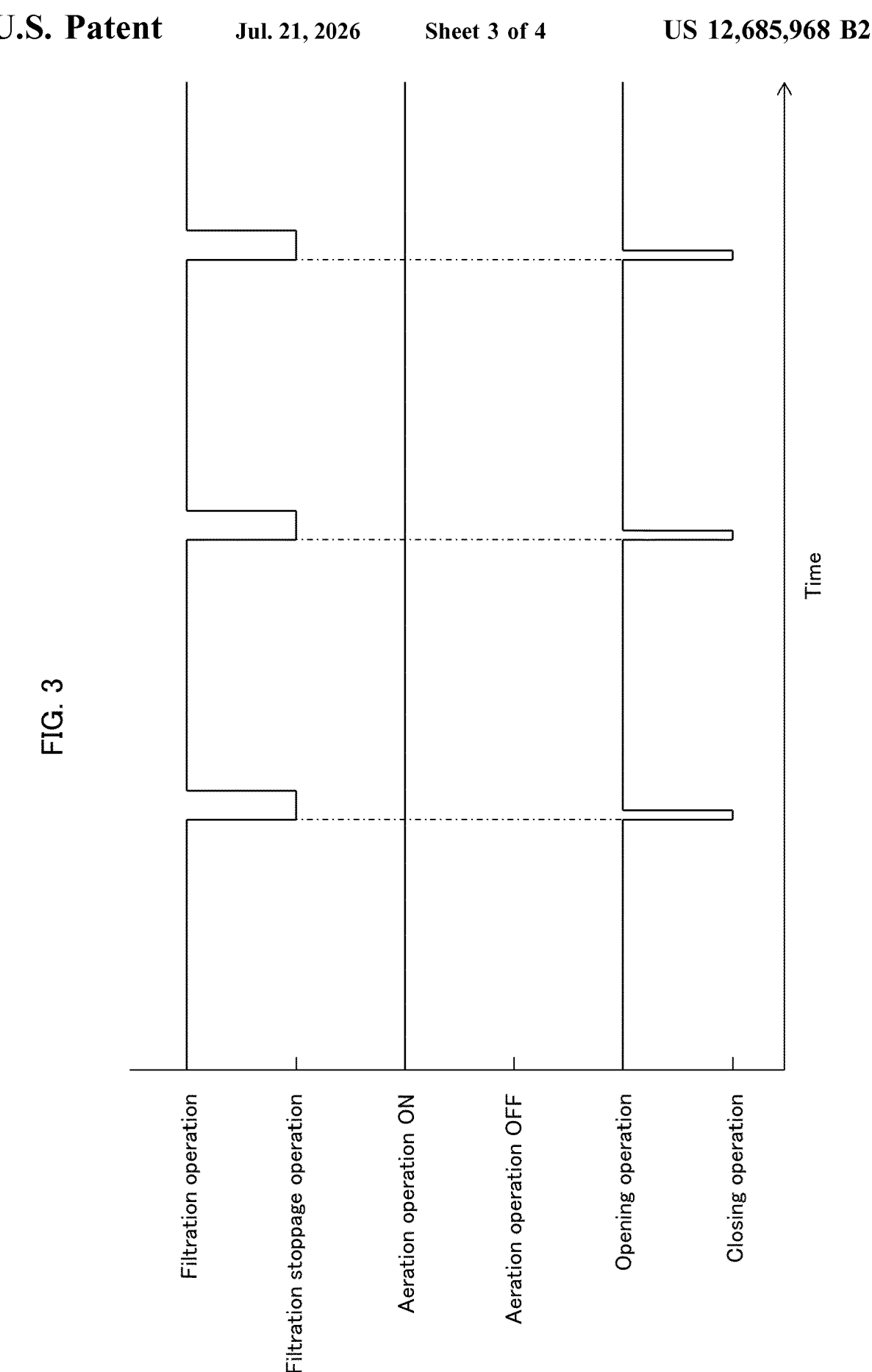
FIG. 3 is a time chart showing a relationship between an aeration operation, a filtration operation, and a filtration stoppage operation and opening and closing operations of a gas vent valve or an atmospheric opening valve.

With reference to FIGS. 2 and 3, the following description will discuss an embodiment of the present invention. FIG. 2 is a view schematically illustrating a wastewater treatment system for carrying out a wastewater treatment method in accordance with Embodiment 1. FIG. 3 is a time chart showing a relationship between an aeration operation, a filtration operation, and a filtration stoppage operation and opening and closing operations of a gas vent valve.

(Wastewater Treatment System 10)

As illustrated in FIG. 2, a wastewater treatment system 10 for carrying out a wastewater treatment method in accordance with Embodiment 1 is a system for subjecting wastewater E (to be treated) to solid-liquid separation with use of a membrane bioreactor (MBR), so as to generate treated water (filtrate) T. The wastewater treatment system 10 includes a membrane separation tank 12 for storing the wastewater E. A water level indicator 14 that detects a level of the wastewater E in the membrane separation tank 12 is provided in an appropriate position of the membrane separation tank 12.

A membrane module 16 that subjects the wastewater E to solid-liquid separation is provided in the membrane separation tank 12 and is immersed in the wastewater E in the membrane separation tank 12. The membrane module 16 has a plurality of membrane cartridges 18 of a flat membrane type which are arranged side by side in an upright state. Each of the membrane cartridges 18 has a filtration plate 20 and membrane sheets 22 provided on both side surfaces of the filtration plate 20. The membrane sheets 22 have respective peripheral portions fixed to the side surfaces of the filtration plate 20. Portions of the membrane sheets 22 other than the peripheral portions are not fixed to the filtration plate 20. Thus, the membrane sheets 22 can swing with respect to the filtration plate 20. Paths, through which treated water (filtrate) T that has permeated through each of the membrane sheets 22 passes, are formed between the filtration plate 20 and the membrane sheets 22 and formed inside the filtration plate 20.

An aeration device 24 that carries out aeration on the plurality of membrane cartridges 18 is provided below the membrane module 16 in the membrane separation tank 12 and is connected to a blower (unillustrated) that generates compressed air. The aeration device 24 supplies oxygen to activated sludge contained in wastewater as well as supplies compressed air to the plurality of membrane cartridges 18 so as to clean the membrane surfaces. This causes an interior of the membrane separation tank 12 to be in an aerobic state so that a nitrification process for wastewater by the activated sludge is carried out.

The wastewater treatment system 10 includes a treated-water tank 26 for storing the treated water T. The treated-water tank 26 is provided in a position separate from the membrane separation tank 12. The level of the treated water T in the treated-water tank 26 is located lower than the level of the wastewater E in the membrane separation tank 12.

The wastewater treatment system 10 includes a treated-water pipe system 28 connecting the membrane separation tank 12 and the treated-water tank 26. A specific configuration of the treated-water pipe system 28 is as follows.

To the membrane module 16, one end portion of a first pipe 30 is connected. To the other end portion of the first pipe 30, a header pipe 32 for accommodating the treated water T generated by the membrane module 16 is connected. The header pipe 32 is located at a position higher than the level of the treated water T in the membrane separation tank 12. In addition, to the header pipe 32, one end portion of a second pipe 34 is connected. The other end portion of the second pipe 34 is connected to the treated-water tank 26. In the second pipe 34, the following are provided in the order written from a header pipe 32 side (upstream side): (i) a pressure indicator 36 that detects a pressure corresponding to the transmembrane pressures of the membrane cartridges 18, (ii) a flowmeter 38 that detects a flow rate of the treated water T, (iii) an adjustment valve 40, and (iv) a shutoff valve 42.

One end portion of a third pipe 44 is connected to a portion of the second pipe 34 between the flowmeter 38 and the adjustment valve 40. The other end portion of the third pipe 44 is connected to the treated-water tank 26. In the third pipe 44, a suction valve 46, a suction pump 48, and a shutoff valve 50 are provided in this order from a side closer to the one end portion of the third pipe 44.

According to the above configuration, in a case where a gravitational filtration operation is carried out, a control device constituted by a computer closes the suction valve 46 and simultaneously opens the shutoff valve 42. The control device then adjusts an opening degree of the adjustment valve 40 to adjust a filtration amount. As a result, a negative pressure is generated on a secondary side (a treated water side) of the plurality of membrane cartridges 18 due to a water head difference between the membrane separation tank 12 and the treated-water tank 26, so that the gravitational filtration operation for the wastewater E is carried out. Further, in a case where a filtration stoppage operation of stopping the gravitational filtration operation is carried out, the control device closes the shutoff valve 42.

In a case where a suction filtration operation is carried out, the control device closes the shutoff valve 42 and simultaneously opens the suction valve 46 and the shutoff valve 50. Subsequently, the control device drives the suction pump 48. As a result, a negative pressure is generated on the secondary side (treated water side) of the plurality of membrane cartridges 18 due to the suction force applied by the suction pump 48, so that the suction filtration operation for the wastewater E is carried out. Further, in a case where a filtration stoppage operation for stopping the suction filtration operation is carried out, the control device stops the driving of the suction pump 48 and closes the shutoff valve 50.

Note that the control device switches between the gravitational filtration operation and the suction filtration operation on the basis of, for example, detection results supplied from the water level indicator 14 and the flowmeter 38.

A gas retention chamber 52 for retaining a gas contained in the treated water T is provided in a top portion of the header pipe 32. The gas retention chamber 52 communicates with an interior of the header pipe 32. A water level indicator 54 that detects a level of the treated water T in the gas retention chamber 52 is provided in an appropriate position of the gas retention chamber 52. Note that the gas retention chamber 52 may be a gas retention tank provided in a position separate from and located higher than the header pipe 32. The gas contained in the treated water T is mainly the air but is not limited to the air.

The wastewater treatment system 10 includes a gas vent pipe system 56 connecting the gas retention chamber 52 and the treated-water tank 26. A specific configuration of the gas vent pipe system 56 is as follows.

To the gas retention chamber 52, one end portion of a fourth pipe 58 is connected. To the other end portion of the fourth pipe 58, an ejector 60 that generates a negative pressure is connected. A gas vent valve 62 that vents a gas retained in the gas retention chamber 52 is provided in the fourth pipe 58. The gas vent valve 62 is connected to the gas retention chamber 52 via the fourth pipe 58. Further, to the ejector 60, one end portion of a fifth pipe 64 is connected. The other end portion of the fifth pipe 64 is connected to the treated-water tank 26. In the fifth pipe 64, the following are provided in the order written from an ejector 60 side: (i) a non-return valve 66 for preventing reverse flow toward the treated-water tank 26 and (ii) an ejector pump 68.

To the ejector 60, one end portion of a sixth pipe 70 is connected. The other end portion of the sixth pipe 70 is opened to the atmospheric air. Below the other end portion of the sixth pipe 70, a hopper 72 for collecting the treated water T is provided. To the hopper 72, one end portion of a seventh pipe 74 is connected. The other end portion of the seventh pipe 74 is connected to the treated-water tank 26.

According to the above configuration, when the water level indicator 54 detects a predetermined first low water level, the control device drives the ejector pump 68 and opens the gas vent valve 62. The treated water T is then supplied at a high speed to the ejector 60, so that the ejector 60 generates a negative pressure. As a result, a gas in the gas retention chamber 52 is sucked and is released to the atmospheric air via the fourth pipe 58 and the sixth pipe 70. At this time, some of the treated water T is sucked together with the gas in the gas retention chamber 52, and is collected into the treated-water tank 26 via the fourth pipe 58, the ejector 60, the sixth pipe 70, the hopper 72, and the seventh pipe 74. The predetermined first low water level is a water level which is lower than a reference water level and at which the gas in the gas retention chamber 52 needs to be vented. Note that the reference water level is a water level which serves as a reference when the closing operation for the gas vent valve 62 is carried out.

When the water level indicator 54 detects the reference water level, the control device closes the gas vent valve 62 and stops the driving of the ejector pump 68. The suction operation for the gas in the gas retention chamber 52 is then stopped, and the treated water T is accumulated in a portion of the fourth pipe 58 between the gas vent valve 62 and the ejector 60.

Note that the control device may carry out operations such as the opening and closing operations for the gas vent valve 62 periodically, instead of carrying out such operations on the basis of the detection result from the water level indicator 54.

As described above, the treated water T is accumulated in the portion of the fourth pipe 58 between the gas vent valve 62 and the ejector 60. Therefore, when the gas vent valve 62 is opened, the treated water T accumulated in the portion of the fourth pipe 58 between the gas vent valve 62 and the ejector 60 is partially supplied to the gas retention chamber 52. That is, the gas vent valve 62 is for supplying the treated water T as a fluid to the gas retention chamber 52 as well as for venting the gas retained in the gas retention chamber 52.

(Wastewater Treatment Method)

As illustrated in FIGS. 2 and 3, the wastewater treatment method in accordance with Embodiment 1 is a method for generating treated water T by subjecting wastewater E to solid-liquid separation by repeating, while aeration is carried out on the plurality of membrane cartridges 18 immersed in the wastewater E in the membrane separation tank 12, the cycle including the filtration operation and the filtration stoppage operation (intermittent filtration cycle). Here, the filtration operation refers to an operation of generating a negative pressure on the secondary side of the plurality of membrane cartridges 18 so as to filter the wastewater E and is intended to include the gravitational filtration operation and the suction filtration operation. The filtration stoppage operation refers to an operation of stopping the filtration operation.

Further, in the wastewater treatment method in accordance with Embodiment 1, the control device opens and then closes the gas vent valve 62 in accordance with the timing of the start of the filtration stoppage operation in each intermittent filtration cycle, so as to prevent the occurrence of air lock (air bubble) in the treated-water pipe system 28.

Specifically, the control device opens the gas vent valve 62 concurrently with or immediately after the start of the filtration stoppage operation in each cycle and, after a predetermined time period (for example, 1 second), closes the gas vent valve 62. The opening degree to which the gas vent valve 62 is to be opened does not need to be maximum but can be mild, provided that a proper amount of the treated water T can be supplied to the gas retention chamber 52.

When the water level indicator 54 detects a predetermined second low water level during the repetition of the intermittent filtration cycle, the control device drives the ejector pump 68 and opens the gas vent valve 62. The gas in the gas retention chamber 52 is then vented, and the level of the treated water T in the gas retention chamber 52 rises. Afterward, when the water level indicator 54 detects the reference water level, the control device closes the gas vent valve 62 and stops the driving of the ejector pump 68. Here, the predetermined second low water level is a water level which is lower than the predetermined first low water level and at which the air lock has not occurred in the treated-water pipe system 28. In other words, the predetermined second low water level is a water level for avoiding the air lock in the treated-water pipe system 28.

Instead of the operation to open the gas vent valve 62 concurrently with or immediately after the start of the filtration stoppage operation in each cycle and, after a predetermined time period, close the gas vent valve 62, the control device may carry out the following operation.

The control device opens the gas vent valve 62 concurrently with or immediately after the start of the filtration stoppage operation in each intermittent filtration cycle and, when the transmembrane pressures of the plurality of membrane cartridges 18 become zero, closes the gas vent valve 62. On the basis of the detection result from the pressure indicator 36, the control device determines that the transmembrane pressures of the plurality of membrane cartridges 18 have become zero.

(Effects)

As described above, the control device opens and then closes the gas vent valve 62 in accordance with a timing of the start of the filtration stoppage operation in each intermittent filtration cycle. Thus, the treated water T retained in the portion of the fourth pipe 58 between the gas vent valve 62 and the ejector 60 is partially supplied to the gas retention chamber 52 in accordance with a timing of the start of the filtration stoppage operation in each intermittent filtration cycle. Then, the negative pressure on the secondary side of the plurality of membrane cartridges 18 is alleviated, so that the transmembrane pressures of the plurality of membrane cartridges 18 each enter an equilibrium state. That is, it is possible that, while a state in which the treated water exists continuously in the treated-water pipe system 28 (a state in which is formed) is maintained, each of the transmembrane pressures of the plurality of membrane cartridges 18 is caused to enter an equilibrium state in a short period of time after the start of the filtration stoppage operation in each intermittent filtration cycle, without opening a part of the treated-water pipe system 28 to the atmospheric air. Thus, while the flux (permeation flux) is set to be high so as to improve the productivity (production efficiency) in generation of the treated water T by the wastewater treatment system 10, it is possible to sufficiently exert the membrane cleaning effect through the relaxation.

In addition, as described above, the control device opens and then closes the gas vent valve 62 in accordance with a timing of the start of the filtration stoppage operation in each intermittent filtration cycle, so as to prevent the occurrence of the air lock in the treated-water pipe system. This makes it possible to stably carry out the filtration operation in each intermittent filtration cycle.

Therefore, according to the wastewater treatment method in accordance with Embodiment 1, while the productivity in generation of the treated water T is improved by the wastewater treatment system 10, it is possible to sufficiently exert the membrane cleaning effect through the relaxation, and at the same time, it is possible to stably carry out the filtration operation in each intermittent filtration cycle.

Embodiment 2

Figure 4:
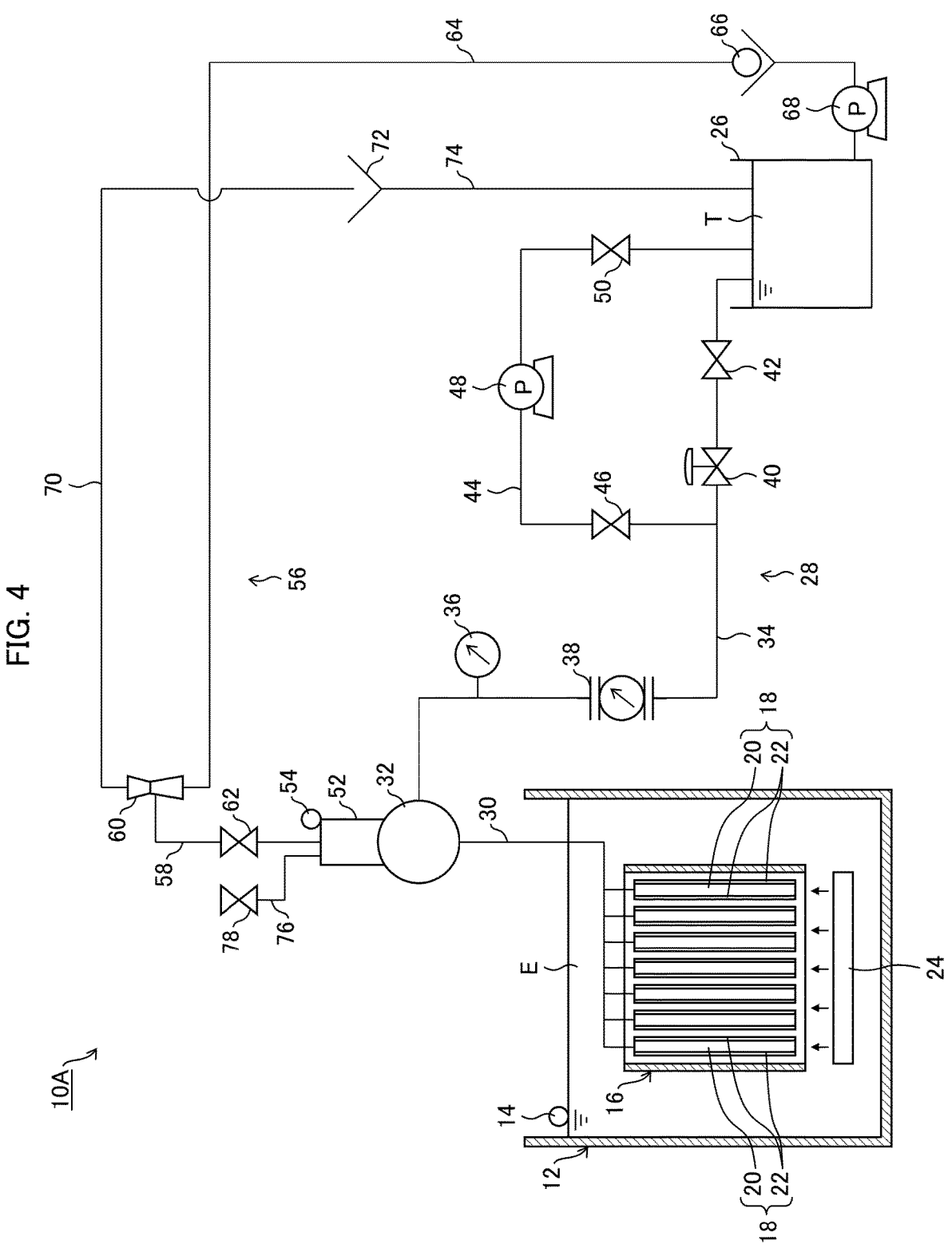
FIG. 4 is a view schematically illustrating a wastewater treatment system for carrying out a wastewater treatment method in accordance with Embodiment 2.

With reference to FIGS. 3 and 4, the following description will discuss Embodiment 2 of the present invention. FIG. 3 is a time chart showing a relationship between an aeration operation, a filtration operation, and a filtration stoppage operation and opening and closing operations of an atmospheric opening valve. FIG. 4 is a view schematically illustrating a wastewater treatment system for carrying out a wastewater treatment method in accordance with Embodiment 2. Note that, for convenience of description, members having functions identical to those of the respective members described in the foregoing embodiment of the present invention are given respective identical reference numerals, and a description of those members will be omitted.

(Wastewater Treatment System)

As illustrated in FIG. 4, a wastewater treatment system 10A for carrying out a wastewater treatment method in accordance with Embodiment 2 is a system for subjecting the wastewater E to solid-liquid separation with use of a membrane bioreactor (MBR), so as to generate the treated water T. The wastewater treatment system 10A has features similar to those of the wastewater treatment system 10. Only the features of the wastewater treatment system 10A which are different from those of the wastewater treatment system 10 will be discussed below.

To the gas retention chamber 52, one end portion of an eighth pipe 76 is connected. To the other end portion of the eighth pipe 76, connected is an atmospheric opening valve 78 for opening the gas retention chamber 52 to the atmospheric air. The atmospheric opening valve 78 is connected to the gas retention chamber 52 via the eighth pipe 76. When the atmospheric opening valve 78 is opened, the gas retention chamber 52 is opened to the atmospheric air, and simultaneously, the air (atmospheric air) is supplied to the gas retention chamber 52. That is, the atmospheric opening valve 78 is for supplying the air as a fluid to the gas retention chamber 52 as well as for opening the gas retention chamber 52 to the atmospheric air.

(Wastewater Treatment Method)

As illustrated in FIGS. 3 and 4, the wastewater treatment method in accordance with Embodiment 2 is a wastewater treatment method for generating treated water T by subjecting wastewater E to solid-liquid separation by repeating, while aeration is carried out on the plurality of membrane cartridges 18 immersed in the wastewater E in the membrane separation tank 12, the cycle including the filtration operation and the filtration stoppage operation (intermittent filtration cycle). Further, in the wastewater treatment method in accordance with Embodiment 2, the control device opens and then closes the atmospheric opening valve 78 in accordance with a timing of the start of the filtration stoppage operation in each intermittent filtration cycle, so as to prevent the occurrence of the air lock (air bubble) in the treated-water pipe system 28.

Specifically, the control device opens the atmospheric opening valve 78 concurrently with or immediately after the start of the filtration stoppage operation in each cycle and, after a predetermined time period (for example, 1 second), closes the atmospheric opening valve 78. The opening degree to which the atmospheric opening valve 78 is to be opened does not need to be maximum but can be mild, provided that a proper amount of the air can be supplied to the gas retention chamber 52.

Instead of the operation to open the atmospheric opening valve 78 concurrently with or immediately after the start of the filtration stoppage operation in each cycle and, after a predetermined time period, close the atmospheric opening valve 78, the control device may carry out the following operation.

The control device opens the atmospheric opening valve 78 concurrently with or immediately after the start of the filtration stoppage operation in each intermittent filtration cycle and, when the transmembrane pressures of the plurality of membrane cartridges 18 become zero, closes the atmospheric opening valve 78.

(Effects)

As described above, the control device opens and closes the atmospheric opening valve 78 in accordance with a timing of the start of the filtration stoppage operation in each intermittent filtration cycle. This causes the air to be supplied to the gas retention chamber 52 in accordance with the timing of the start of the filtration stoppage operation in each intermittent filtration cycle. Then, the negative pressure on the secondary side of the plurality of membrane cartridges 18 is alleviated, so that the transmembrane pressures of the plurality of membrane cartridges 18 each enter an equilibrium state. That is, it is possible that, while a state in which the treated water exists continuously in the treated-water pipe system 28 (a state in which siphon is formed) is maintained, each of the transmembrane pressures of the plurality of membrane cartridges 18 is caused to enter an equilibrium state in a short period of time after the start of the filtration stoppage operation in each intermittent filtration cycle, without opening a part of the treated-water pipe system 28 to the atmospheric air. Thus, while the flux (permeation flux) is set to be high so as to improve the productivity (production efficiency) in generation of the treated water T by the wastewater treatment system 10A, it is possible to sufficiently exert the membrane cleaning effect through the relaxation.

In addition, as described above, the control device opens and then closes the atmospheric opening valve 78 in accordance with the timing of the start of the filtration stoppage operation in each intermittent filtration cycle, so as to prevent the occurrence of the air lock in the treated-water pipe system. This makes it possible to stably carry out the filtration operation in each intermittent filtration cycle.

That is, according to the wastewater treatment method in accordance with Embodiment 2, while the productivity in generation of the treated water T is improved by the wastewater treatment system 10A, it is possible to sufficiently exert the membrane cleaning effect through the relaxation, and at the same time, it is possible to stably carry out the filtration operation in each intermittent filtration cycle.

Aspects of the present invention can also be expressed as follows:

A wastewater treatment method in accordance with Aspect 1 of the present invention is a wastewater treatment method for generating treated water by subjecting wastewater (to be treated) to solid-liquid separation by repeating, while aeration is carried out on at least one membrane cartridge immersed in the wastewater in a membrane separation tank, a cycle including a filtration operation of generating a negative pressure on a secondary side (treated water side) of the at least one membrane cartridge so as to filter the wastewater and a filtration stoppage operation of stopping the filtration operation, said method includes: using a valve that is connected to a gas retention chamber for retaining a gas contained in the treated water and that supplies a fluid to the gas retention chamber, in a manner so as to open and then close the valve in accordance with a timing of start of the filtration stoppage operation in the cycle.

According to the above arrangement, the valve is opened and then closed in accordance with the timing of the start of the filtration stoppage operation of the cycle. This causes a fluid to be supplied to the gas retention chamber in accordance with the timing of the start of the filtration stoppage operation of the cycle. Then, a negative pressure on a secondary side of the at least one membrane cartridge is alleviated in a short time, so that the transmembrane pressure of the at least one membrane cartridge enters an equilibrium state. That is, it is possible that while a state in which the treated water exists continuously in the treated-water pipe system (a state in which siphon is formed) is maintained, the transmembrane pressure of the at least one membrane cartridge is caused to enter an equilibrium state after the start of the filtration stoppage operation of the cycle, without opening, to the atmospheric air, a part of the treated-water pipe system connecting the membrane separation tank and the treated-water tank. Therefore, while productivity (production efficiency) in generation of treated water is improved, it is possible to sufficiently exert a membrane cleaning effect through relaxation.

A wastewater treatment method in accordance with Aspect 2 of the present invention may be arranged, in Aspect 1, such that the valve is a gas vent valve provided in a pipe that connects the gas retention chamber and an ejector which generates the negative pressure.

According to the above arrangement, the gas vent valve is opened and then closed in accordance with the timing of the start of the filtration stoppage operation in the cycle. This causes the treated water to be supplied to the gas retention chamber in accordance with the timing of the start of the filtration stoppage operation in the cycle.

A wastewater treatment method in accordance with Aspect 3 of the present invention may be arranged, in Aspect 1, such that the valve is an atmospheric opening valve configured to open the gas retention chamber to atmospheric air.

According to the above arrangement, the atmospheric opening valve is opened and then closed in accordance with the timing of the start of the filtration stoppage operation in the cycle. This causes the air to be supplied to the gas retention chamber in accordance with the timing of the start of the filtration stoppage operation in the cycle.

A wastewater treatment method in accordance with Aspect 4 of the present invention may be arranged, in any one of Aspects 1 to 3, such that the valve is opened and then closed in accordance with a timing of start of the filtration stoppage operation in the cycle, so as to prevent occurrence of air lock (air bubble) in a treated-water pipe system that connects the membrane separation tank and a treated-water tank for storing the treated water.

According to the above arrangement, the valve is opened and then closed in accordance with the timing of the start of the filtration stoppage operation, so as to prevent the occurrence of the air lock in the treated-water pipe system. This makes it possible to stably carry out the filtration operation in the cycle.

A wastewater treatment method in accordance with Aspect 5 of the present invention may be arranged, in any one of Aspects 1 to 3, such that the valve is opened concurrently with or immediately after start of the filtration stoppage operation in the cycle and, when a transmembrane pressure of the at least one membrane cartridge becomes zero, the valve is closed.

According to the above arrangement, the valve is opened concurrently with or immediately after the start of the filtration stoppage operation in the cycle, and, when the transmembrane pressure of the at least one membrane cartridge becomes zero, the valve is closed. This causes a fluid to be supplied to the gas retention chamber in accordance with the timing of the start of the filtration stoppage operation in the cycle, and therefore it is possible to cause the transmembrane pressure of the at least one membrane cartridge to enter an equilibrium state.

Additional Remark

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10 Wastewater treatment system
12 Membrane separation tank

14 Water level indicator
16 Membrane module
18 Membrane cartridge
20 Filtration plate
22 Membrane sheet
24 Aeration device
26 Treated-water tank
28 Treated-water pipe system
30 First pipe
32 Header pipe
34 Second pipe
36 Pressure indicator
38 Flowmeter
40 Adjustment valve
42 Shutoff valve
44 Third pipe
46 Suction valve
48 Suction pump
50 Shutoff valve
52 Gas retention chamber
54 Water level indicator
56 Gas vent pipe system
58 Fourth pipe
60 Ejector
62 Gas vent valve
64 Fifth pipe
66 Non-return valve
68 Ejector pump
70 Sixth pipe
72 Hopper
74 Seventh pipe
10A Wastewater treatment system
76 Eighth pipe
78 Atmospheric opening valve E Wastewater (water to be treated)
T Treated water (filtrate)

The invention claimed is:

1. A wastewater treatment method for generating treated water by subjecting wastewater to solid-liquid separation by repeating, while aeration is carried out on at least one membrane cartridge immersed in the wastewater in a membrane separation tank, a cycle including a filtration operation of generating a negative pressure on a secondary side of the at least one membrane cartridge so as to filter the wastewater and a filtration stoppage operation of stopping the filtration operation, said method comprising:

using a valve that is connected to a gas retention chamber for retaining a gas contained in the treated water and that supplies a fluid to the gas retention chamber, in a manner so as to open and then close the valve in accordance with a timing of start of the filtration stoppage operation in the cycle, wherein the valve is a gas vent valve provided in a pipe that connects the gas retention chamber and an ejector which generates the negative pressure.

2. The wastewater treatment method according to claim 1, wherein the valve is opened and then closed in accordance with a timing of start of the filtration stoppage operation in the cycle, so as to prevent occurrence of air lock in a treated-water pipe system that connects the membrane separation tank and a treated-water tank for storing the treated water.

3. The wastewater treatment method according to claim 1, wherein the valve is opened concurrently with or immediately after start of the filtration stoppage operation in the cycle and, when a transmembrane pressure of the at least one membrane cartridge becomes zero, the valve is closed.

* * * * *